(12) United States Patent
Lenhart et al.

(10) Patent No.: US 8,807,152 B2
(45) Date of Patent: Aug. 19, 2014

(54) LENGTH-ADJUSTABLE POLE AND CLAMPING APPARATUS THEREFOR

(71) Applicant: Eberhad Heim, Unterensingen (DE)

(72) Inventors: Klaus Lenhart, Ohmden (DE); Eberhad Heim, Unterensingen (DE)

(73) Assignee: Lekisport AG, Baar (CH)

( * ) Notice: Subject to any disclaimer, the term of this patent is extended or adjusted under 35 U.S.C. 154(b) by 0 days.

(21) Appl. No.: 13/846,473

(22) Filed: Mar. 18, 2013

(65) Prior Publication Data

US 2013/0312798 A1    Nov. 28, 2013

Related U.S. Application Data

(63) Continuation of application No. 13/133,590, filed as application No. PCT/CH2010/000020 on Jan. 26, 2010, now Pat. No. 8,496,018.

(30) Foreign Application Priority Data

Jan. 29, 2009    (CH) ........................................ 0135/09
Jul. 7, 2009    (CH) ........................................ 1055/09

(51) Int. Cl.
*A45B 9/00*    (2006.01)

(52) U.S. Cl.
USPC ............................................ 135/75; 280/823

(58) Field of Classification Search
USPC ........ 135/75; 403/109.5, 322.4, 377; 280/823
See application file for complete search history.

(56) References Cited

U.S. PATENT DOCUMENTS

| | | | |
|---|---|---|---|
| 2,710,207 | A | 6/1955 | Meuller |
| 3,305,234 | A | 2/1967 | Cline et al. |
| 4,497,092 | A | 2/1985 | Hoshino |
| 4,596,484 | A | 6/1986 | Nakatani |
| 4,643,460 | A | 2/1987 | Lieberg |

(Continued)

FOREIGN PATENT DOCUMENTS

| | | |
|---|---|---|
| DE | 694 01 765 T2 | 10/1997 |
| EP | 0 299 491 A1 | 1/1989 |

(Continued)

*Primary Examiner* — Noah Chandler Hawk
(74) *Attorney, Agent, or Firm* — Sughrue Mion, PLLC

(57) ABSTRACT

A clamping apparatus for a hiking pole for detachably axially fixing a pipe section that can be inserted into an opening of the clamping apparatus. The clamping apparatus has a plastic collar, which substantially directly encloses the pipe section at least in an axial section and clamps the same in the closed state, wherein at least in the region enclosing the pipe section the plastic collar has at least one axial slot making the circumference of the plastic collar variable in that region and is designed in a substantially peripheral manner in the remaining axial region. There are projections with a stop and a rotational axis for a clamping lever with an arm, the axis being arranged perpendicular to the axis of the transverse pin and perpendicular to the axis of the pipe section. The clamping lever also has a roll-off region, which is eccentric with respect to the rotational axis.

26 Claims, 9 Drawing Sheets

(56) References Cited

U.S. PATENT DOCUMENTS

| | | |
|---|---|---|
| 5,441,307 A | 8/1995 | Quintana et al. |
| 5,478,117 A | 12/1995 | Quintana et al. |
| 5,873,611 A | 2/1999 | Munley et al. |
| 6,672,631 B1 | 1/2004 | Weinhold |
| 6,676,329 B2 | 1/2004 | Mandon et al. |
| 6,719,259 B2 | 4/2004 | Huang et al. |
| 6,972,042 B2 | 12/2005 | Benson |
| 7,244,070 B2 | 7/2007 | Burnett et al. |
| 7,261,263 B2 | 8/2007 | Baker et al. |
| 7,726,898 B2 | 6/2010 | Lenhart |
| 8,006,711 B2 | 8/2011 | Pietrzak et al. |
| 8,025,455 B2 | 9/2011 | Huang et al. |
| 2008/0121260 A1 | 5/2008 | Stephens et al. |

FOREIGN PATENT DOCUMENTS

| | | |
|---|---|---|
| EP | 0 822 346 A1 | 2/1998 |
| EP | 0 988 898 A2 | 3/2000 |
| EP | 1 217 224 A1 | 6/2002 |
| EP | 1 450 906 B1 | 9/2004 |

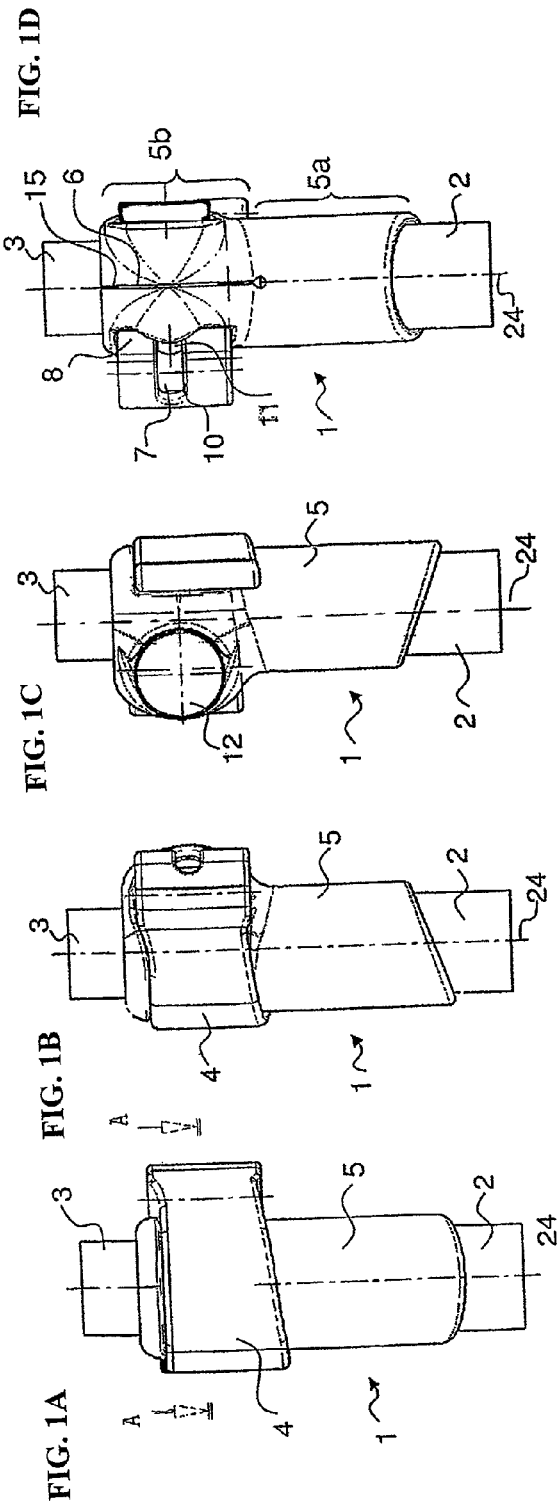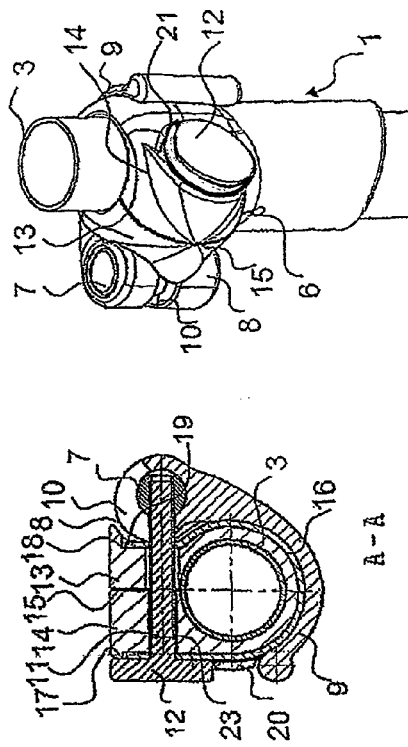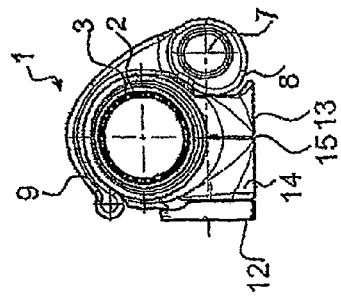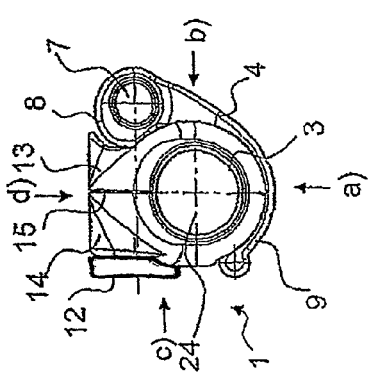

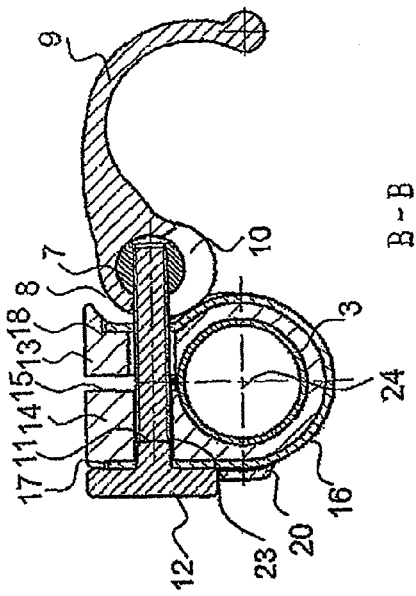
FIG. 1L
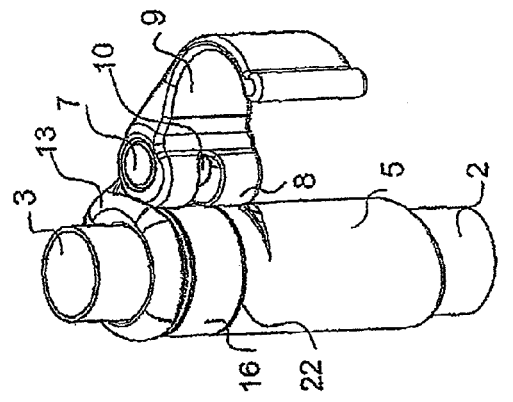
FIG. 1K
FIG. 1N
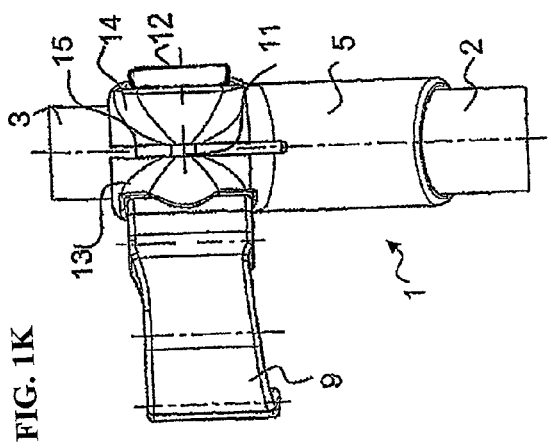
FIG. 1I
FIG. 1M
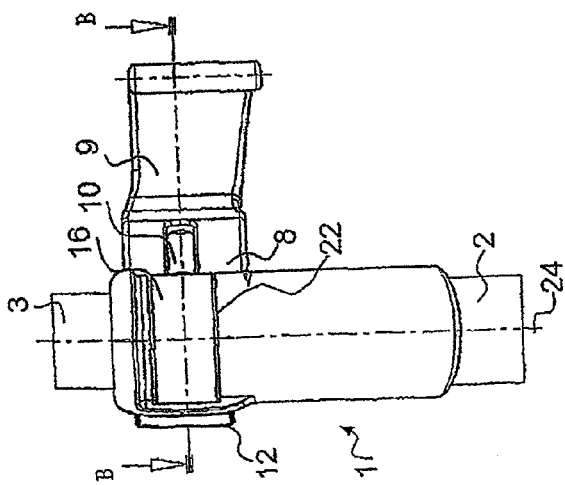
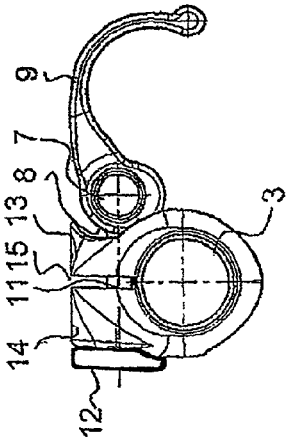

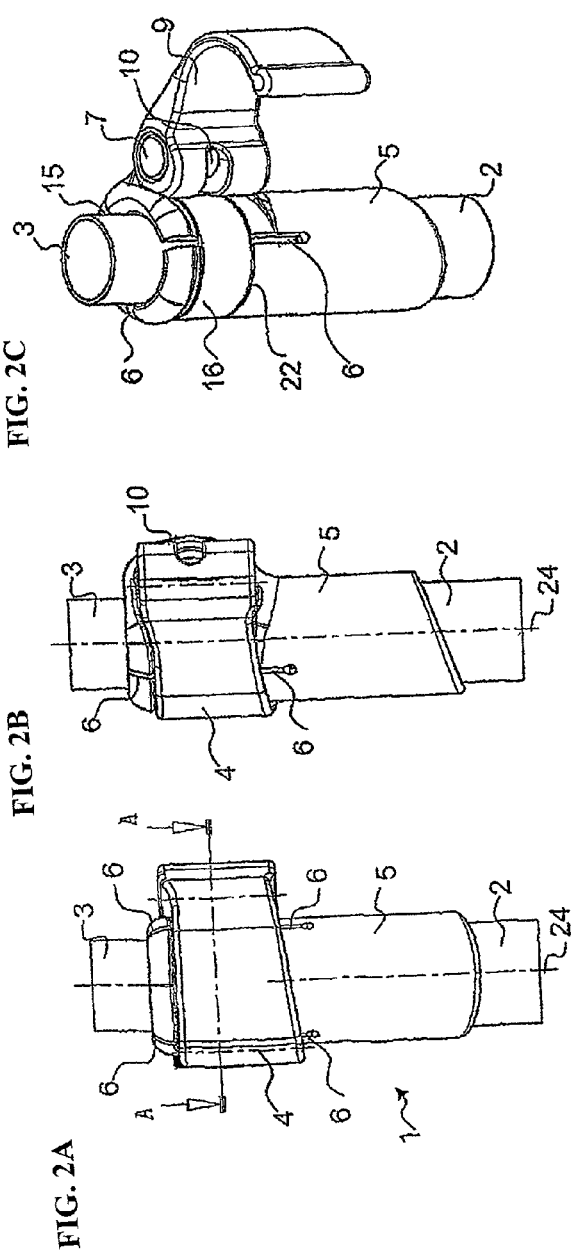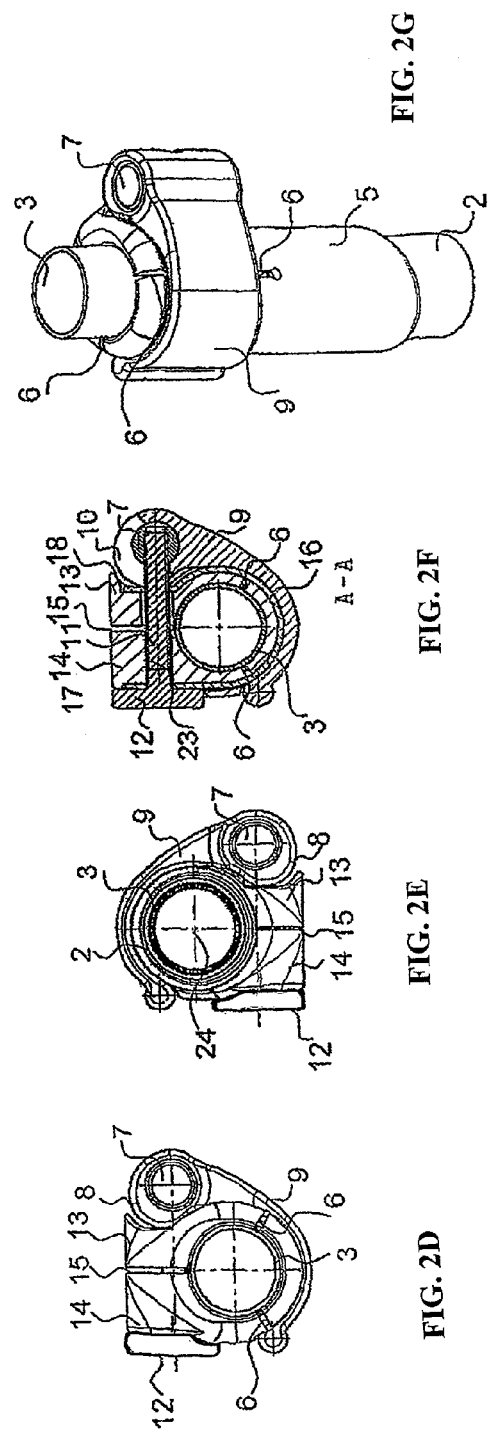

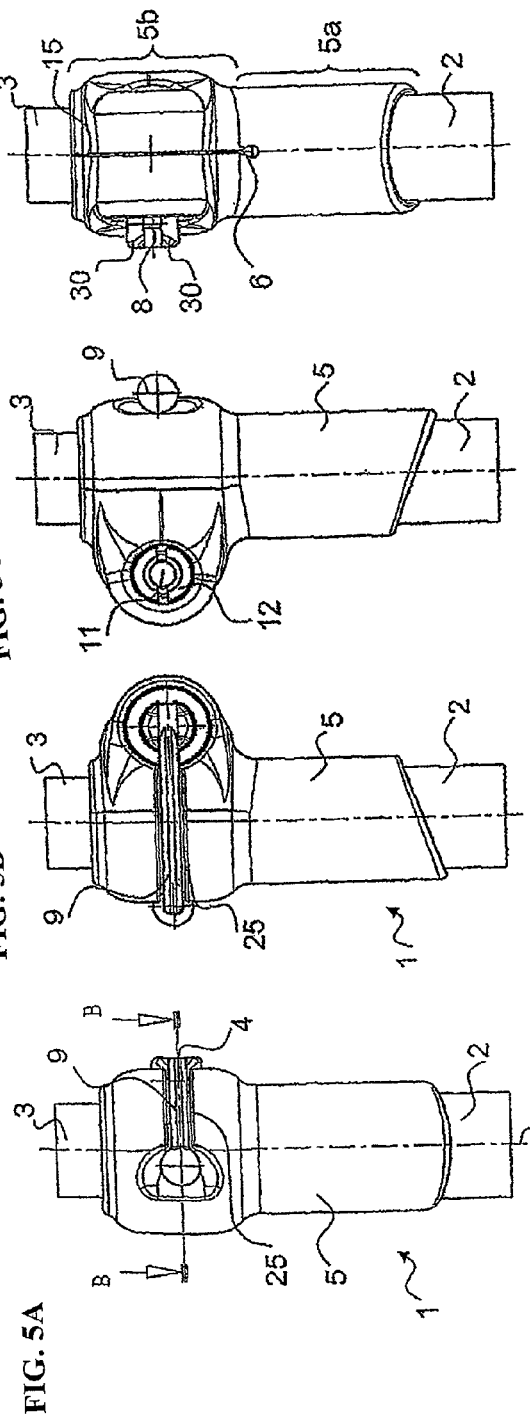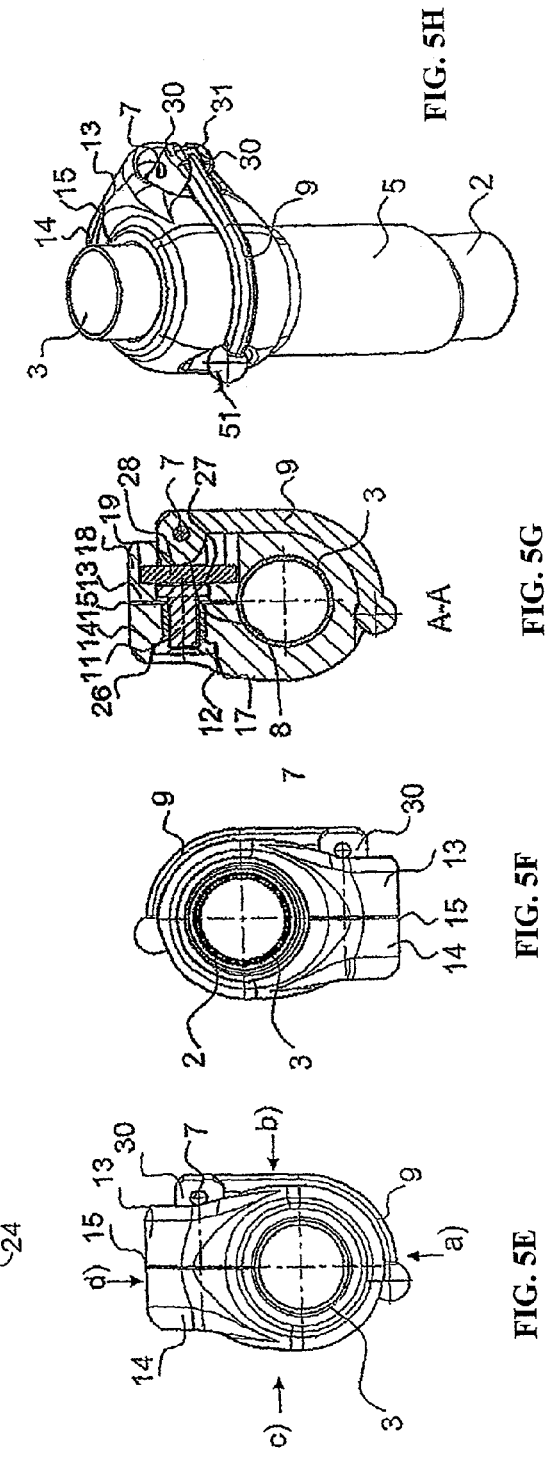

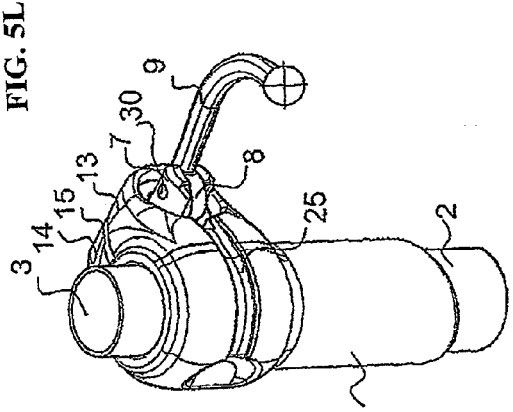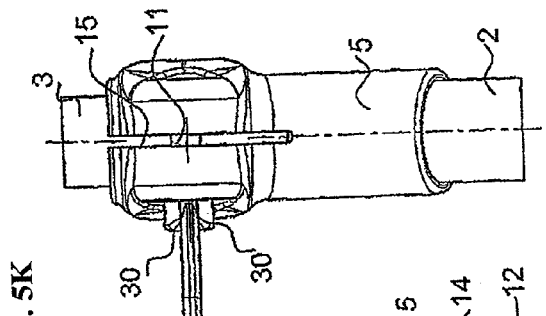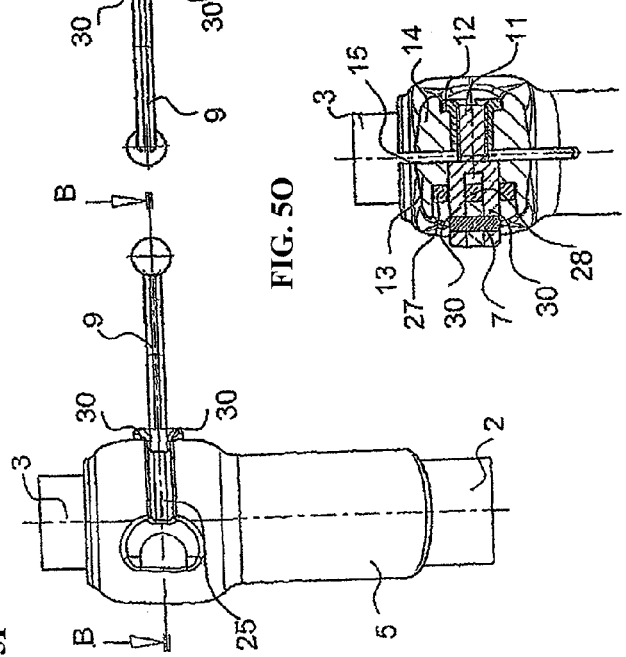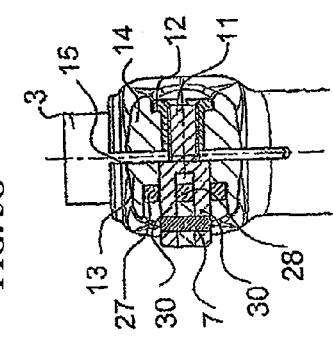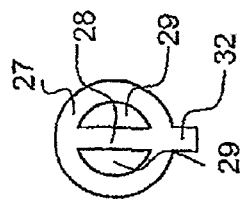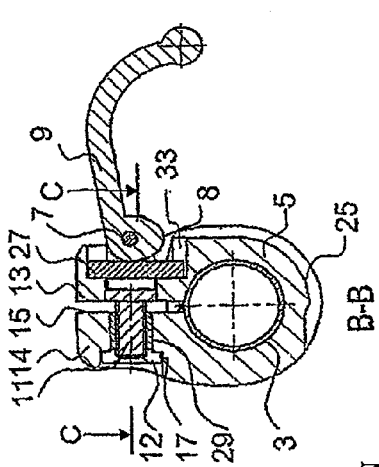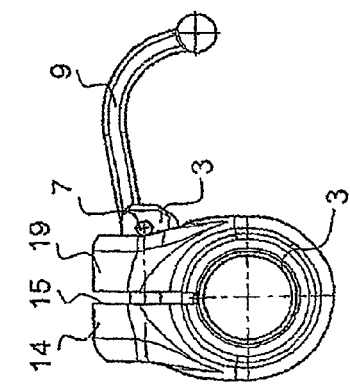

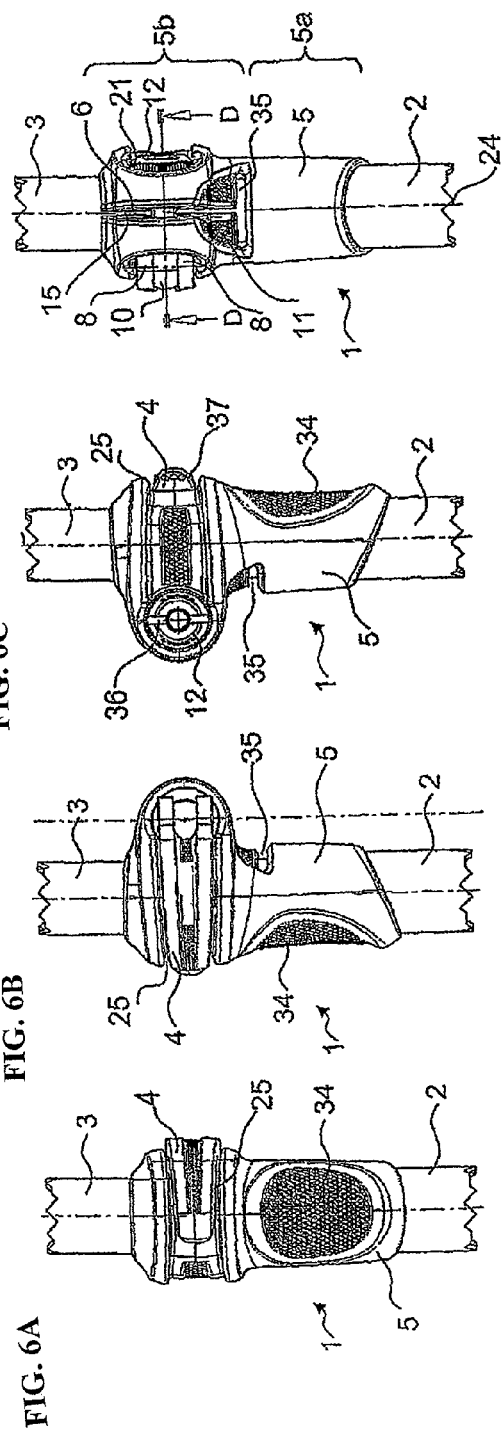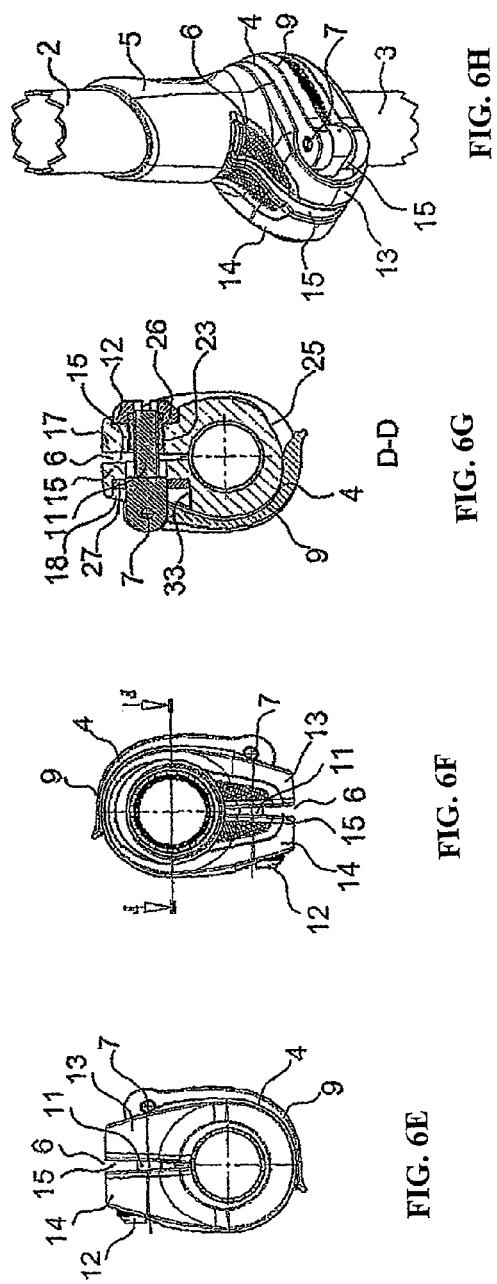

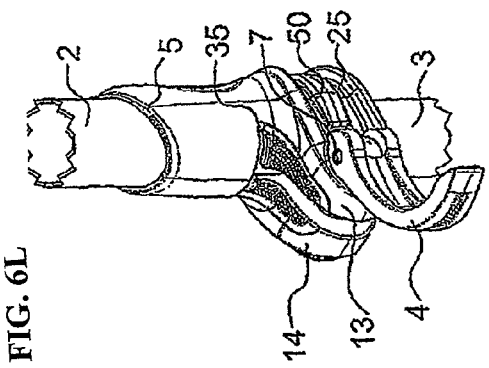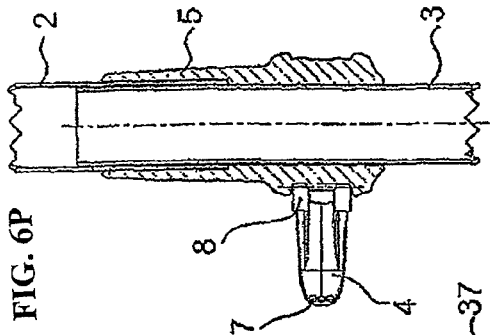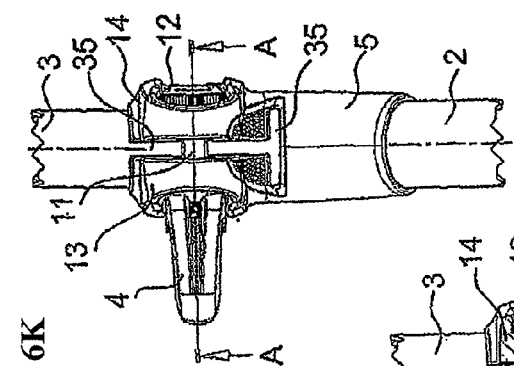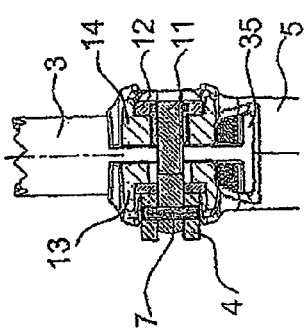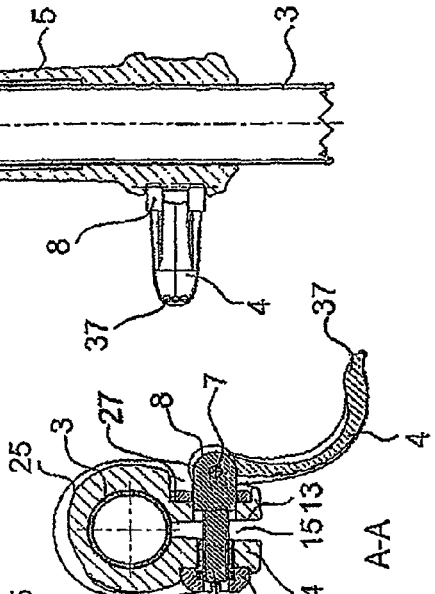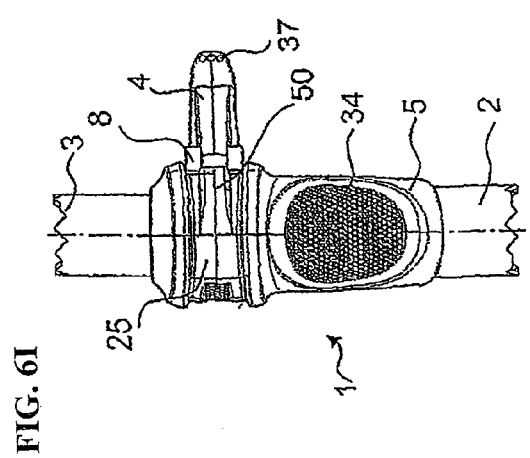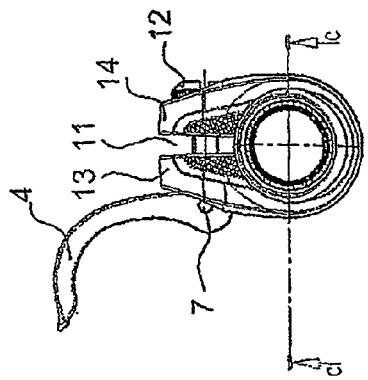

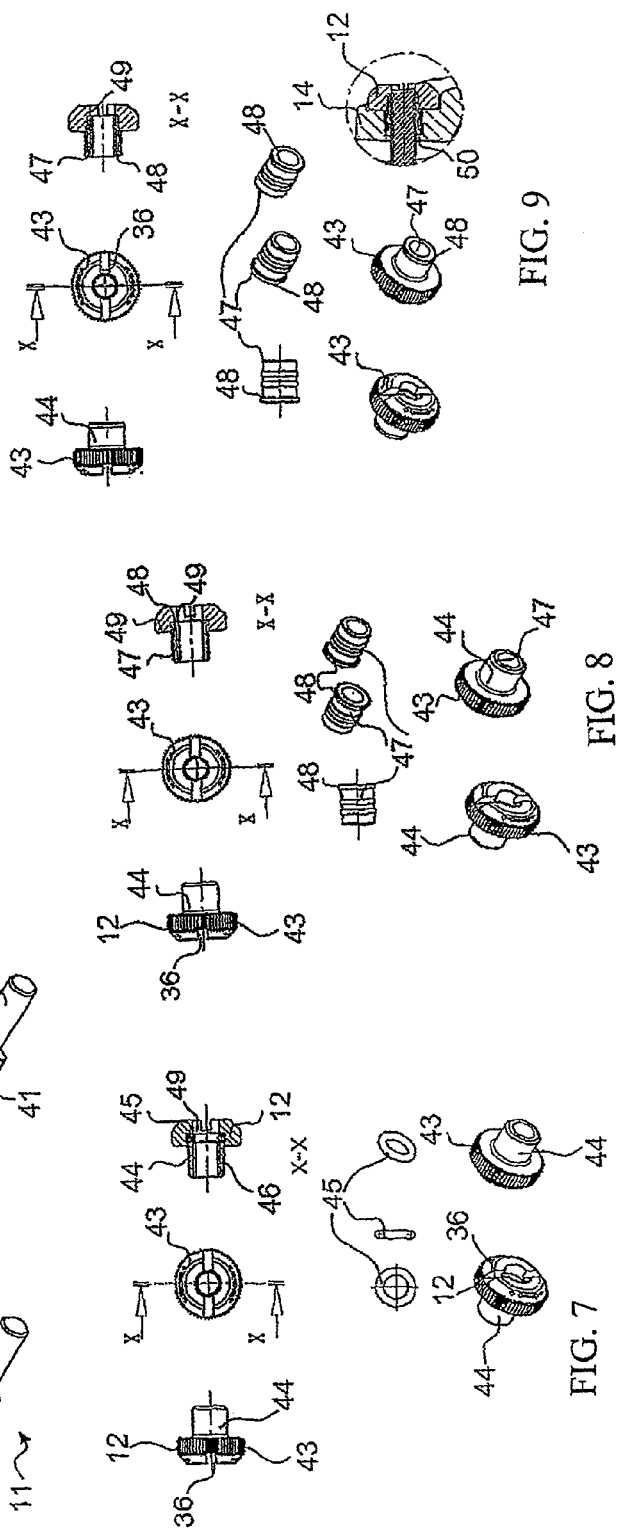
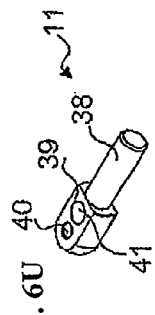
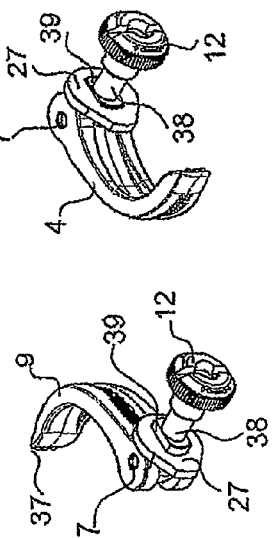
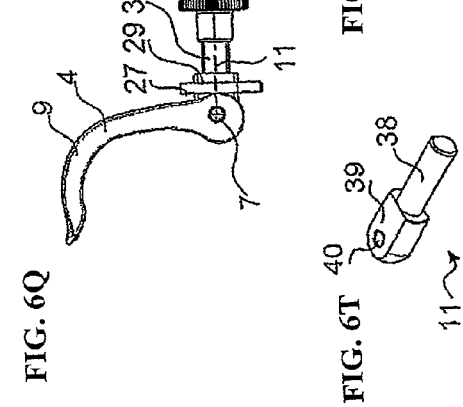
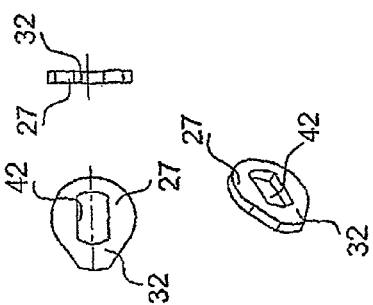

LENGTH-ADJUSTABLE POLE AND CLAMPING APPARATUS THEREFOR

This is a Continuation of application Ser. No. 13/133,590 filed Jun. 8, 2011, claiming priority based on International Application No. PCT/CH2010/000020, filed on Jan. 26, 2010, which claims priority from Swiss Patent Application Nos. 00135/09, filed on Jan. 29, 2009 and 01055/09, filed on Jul. 7, 2009, the contents of all of which are incorporated herein by reference in their entirety.

TECHNICAL FIELD

The present invention relates to a length-adjustable pole, in particular for use as a hiking pole, trekking pole, Nordic walking pole or (cross-country) ski pole, and to a clamping device for securing the relative position of tube portions of such a pole.

PRIOR ART

In order for a hiking pole, trekking pole, Nordic walking pole or (cross-country) ski pole to be of variable length, there have been mechanisms developed which allow two pole-forming tube portions to be set differently in respect of their axial position in order to meet requirements in each case. For this purpose, use is usually made of two tube portions which have different diameters, and therefore the one tube can be pushed into the other for adjustment purposes.

On the one hand, for this purpose, there are devices in which the clamping mechanism is arranged, as it were, in the interior of the pole-forming tubes. EP 1450906 discloses, for example, a device in which is provided a threaded rod which is fastened in an inner tube, projects into the outer tube and on which is mounted a conical inner element with an internal thread. Arranged around this inner element is a spreading element with a mating cone which, when the inner element is driven into the spreading element by virtue of the two tube portions being rotated, is spread apart in a manner which secures the two tube portions.

On the other hand, there are devices which are arranged on the outside, in the manner of a clip. For example, DE 69401765 describes a device in which a plastics-material sleeve and a clamping lever are arranged around a slotted tube, and in which the clamping lever, with a pin passing through protrusions arranged on the sleeve, can be folded over and the clamping device can thus be clamped. In the case of this design, it is therefore the case that, rather than the inner tube being clamped directly by the sleeve, the sleeve rests on the outer tube, that the outer tube has a slot, and the clamping device, in other words, presses the outer tube onto the inner tube. A further clamping mechanism of essentially identical design is known from EP 098898. A further externally arranged device is known from EP 1217224. This document likewise has a clamping lever, although in this case the latter can be folded over by tilting about an axis perpendicular to the pole axis, and is of, as it were, fork-like design.

DESCRIPTION OF THE INVENTION

Accordingly, it is an object of the invention, inter alia, to propose an improved clamping device for the purposes indicated above. The aim here, in particular, is to propose a clamping device which is of straightforward design, which, with a low level of force being applied in order to fold over a lever, has a nevertheless high clamping force and which functions properly even at a wide variety of different temperatures and under the influence of ice, snow and dirt.

This object is achieved in that the invention proposes a clamping device for a hiking pole, trekking pole, Nordic walking pole or (cross-country) ski pole, for axially securing in a releasable manner a tube portion which can be pushed into an opening of the clamping device, the latter having essentially the following features:

- the clamping device comprises a plastics-material sleeve which engages at least essentially directly around the tube portion, at least along an axial portion, and clamps the same in the closed state;
- the plastics-material sleeve, at least in the region engaging around the tube portion, has at least one axial slot, which renders the circumference of the plastics-material sleeve variable in this region, and is of essentially encircling design in the remaining axial region;
- a respective protrusion is arranged on the plastics-material sleeve on either side of this slot (the protrusions run essentially perpendicularly to the axis of the tube portion), wherein these protrusions have a coaxial through-passage opening, which is arranged essentially perpendicularly to the axis of the tube portion and through which engages a transverse pin (the slot between the two protrusions may be designed as a straightforward linear radial slot, although it may also be, for example, of curved or angular design or have a plurality of turns, which results in a lower susceptibility to soiling);
- the transverse pin, on the outside of the second protrusion, has a stop and, on the outside of the first protrusion, has a rotary pin for a clamping lever, this pin being arranged perpendicularly to the axis of the transverse pin and parallel to the axis of the tube portion;
- the clamping lever has a lever arm which preferably, with the clamping device closed, engages at least partially around the plastics-material sleeve;
- the clamping lever has an eccentric rolling region (or sliding region) around the rotary pin, it being possible for the distance between the stop and a counter-surface, which is arranged on the outside of the first protrusion, to be reduced by means of this rolling region for clamping purposes by virtue of the clamping lever being pivoted into the closed position;
- the counter-surface is designed in the form of a counter-pressure element, preferably a metal element, which is arranged, at least in part, in the first protrusion, in a depression.

Eccentric here, in conjunction with the rolling region, is to be understood to mean that the radius of the rolling region, rather than being constant around the rotary pin of the lever, gradually increases along the critical portion, that is to say where, within the context of the adjustment region of the lever, the rolling region rests on the counter-surface. This is such that, with the clamping device closed, that is to say with the clamping lever positioned fully against the clamping device, this radius is at its maximum, and thus the distance between the counter-surface and the stop assumes a minimum value, and, with the clamping device open, that is to say with the clamping lever projecting, the radius has a lower value, and therefore the distance between the counter-surface and the stop assumes a greater value, and therefore the slotted region of the sleeve has a greater internal diameter. The rolling surface and rotary pin of the lever are thus arranged eccentrically.

The core of the invention thus consists, inter alia, in providing a counterpressure element, preferably in the form of a metallic element, as a bearing surface or counter-surface for this rolling region. This achieves better sliding properties for the rolling region (the latter, like the clamping lever as a whole, may likewise be made of metal or else of plastics material), both the counter-surface and the rolling region are subjected to a lower level of wear, and the additional at least partial recessing in the protrusion largely prevents the situation where the metal element, which forms the counter-surface, can be soiled or harmful pieces of dirt can penetrate into the critical region. Moreover, arrangement in the depression ensures better guidance as the lever is being folded over, and a more esthetically pleasing design is achieved.

The counter-surface may be designed, in principle, as a curved surface which has, for example, a radius of curvature which corresponds essentially to the maximum radius of curvature of the eccentric region of the rolling region of the clamping lever. In general terms, according to a first exemplary embodiment, the counter-surface may be designed as a concave surface of which the radius of curvature is adapted essentially to the radius of curvature of the rolling region.

The counter-surface is preferably designed as a surface which is planar in the bearing region, and this results in extremely low frictional forces since the counter-surface is a metallic element, but it is nevertheless possible for the pressure to be transmitted very efficiently to the surrounding plastics-material region. Whereas it is not normally expediently possible, as a result of the highly local forces, to render the counter-surface planar in purely plastics-material designs according to the prior art, this is possible in a very efficient manner in the case of a metal design.

The plastics-material sleeve may be formed from a plastics material, such as polyethylene, polyamide (in particular PA66), polycarbonate, polypropylene, acrylonitrile butadiene styrene copolymer (ABS) or also mixtures (blends) or combinations (bicomponents) of such materials, possibly with reinforcements made of carbon fibers or glass fibers. The plastics-material sleeve is preferably formed in a single piece from such a material and may have on the inside, in particular in the clamping region, a special coating or strip or a cylindrical insert made of a material exhibiting high friction (rubber or the like), in order to increase the axial securing force. It is also possible for the lever to be formed from such a plastics material and to be in a single piece, although the lever may also be produced from metal; also possible is a metal lever with plastics-material actuating regions formed thereon or adhesively bonded thereto. The transverse pin is typically made of metal, but may also be produced from a highly stable plastics material (for example glass-fiber-reinforced materials or carbon-fiber-reinforced materials).

According to a preferred embodiment of the clamping device, the metal element is designed in the form of a preferably single-piece metal band which encircles the outside of the plastics-material sleeve, on the side located opposite the protrusions, and of which the first end is arranged on the outside of the first protrusion, the outside being directed toward the rolling region, in a depression and has a first aperture or a through-opening for the transverse pin. The central region of the band runs around the plastics-material sleeve, preferably in an encircling depression. The second end of the band is arranged on the outside of the second protrusion, this outside being directed toward the stop, preferably in a depression, and the second end of the band has a second aperture or a through-opening for the transverse pin and/or a stop element.

One problem with the customary use of plastics material for the sleeves in such clamping devices is the fact that plastics material has fairly large differences in dimensions at different temperatures. Since this has a direct effect on the clamping force, and for example a device which is tightly clamped at low temperature can release when subjected to solar radiation, this may constitute a risk. Plastics material is further problematic because it has a not inconsiderable coefficient of expansion, and thus has an elasticity which impairs the clamping force. In addition, with frequent use, plastics material will gradually stretch, and the possible clamping force will therefore decrease or render constant resetting necessary. All these problems can be overcome if the critical circumferential region of the sleeve, this region being critical essentially for the applied clamping force, is enclosed by such a metal band and it is thus also the case in this region that the negative properties of the plastics material are, as it were, neutralized. This results in a considerably more stable and more prolonged clamping force than is at all possible using the plastics-material designs which are in common use. It is nevertheless possible to avoid producing the entire clamping device from a metallic material, however.

The metal band here has, for example, a width of 1-20 mm, preferably of 2-10 mm, in particular preferably of 3-7 mm, and preferably a thickness in the range of 0.1-2 mm, in particular preferably a thickness in the range of 0.25-1.5 mm, wherein the metal band consists in particular preferably of hardened steel, stainless steel or spring steel. It is also conceivable to have a plastics-material band with high tensile resistance, possibly with fiber reinforcement.

The metal element may be produced, in principle, from steel, in full or in part, or surface-hardened steel. Hardened aluminum is also possible.

The lever may consist, in principle, of metal or plastics material. If it consists of metal, then it may be produced from steel, in full or in part, or surface-hardened steel (hardened, in particular, in the rolling region). Hardened aluminum is also possible. If the lever consists of metal, then it may have formed-on plastics-material regions in order to allow special ergonomic shaping; in this case it is also possible for such elements to be formed from easy-to-grip material. Such plastics-material regions may be fitted on a metal lever either during injection molding or during assembly.

According to a further preferred embodiment, the metal element may have a respective through-opening on either side of the counter-surface, wherein the counter-surface is then formed by the crosspiece located therebetween. The transverse pin here is designed in a fork-like manner at its clamping-lever end, wherein the two fork arms engage through the through-openings. The rotary pin is arranged at the ends of the fork arms, and connects the same, and the rolling region of the clamping lever is arranged between the fork arms such that it runs on the crosspiece when the clamping lever pivots.

It is preferable for at least the regions which are in (frictional) contact with one another (in particular metal disk and crosspiece and rolling region of the lever) to be produced from hardened materials or to be specifically hardened there.

In this embodiment, in which typically these through-openings for the fork arms are designed, for example, as halfmoon-shaped holes located opposite one another, it is possible for the forces which are applied very locally to the normally planar crosspiece, but which can be distributed to good effect along the annular circumferential surface of the metal element, to generate very high clamping forces along with low friction. Such an embodiment is typically characterized in that the metal element is designed in the form of a circular disk and is arranged in a depression in the first protrusion along the axis of the transverse pin, and in that the depth of the depression is greater than the thickness of the metal element. The thickness of the metal element is preferably in the range of 0.5-3 mm, preferably in the range of 1-2 mm, and the depth of the depression is in the range of 3-10 mm, preferably in the range of 5-8 mm.

A further preferred embodiment is characterized in that the transverse pin is of T-shaped design at its clamping-lever end, wherein the lateral arms of this T form the rotary pin for the clamping lever, and the clamping lever, for the transverse pin, has a slot which is elongate in the pivoting direction and divides up the rolling region into two rolling regions arranged to the sides of the transverse pin.

It is generally possible, for weight-saving purposes, for the rotary pin and, equally, the transverse pin to be drilled or even to be of hollow design.

It is preferred if a single slot is provided only between the two protrusions, and for the rest of the sleeve to be of encircling design. In particular in order to allow relatively large adjustment regions, however, it may be advantageous in certain cases if the plastics-material sleeve, in its upper portion, that is to say in the actual clamping region, has at least two, preferably at least three, axially running slots, wherein one of these slots is arranged between the two protrusions and these slots are preferably distributed uniformly around the circumference.

The stop is preferably of adjustable design, that is to say it is possible for the minimum distance between the counter-surface and stop to be set in a variable manner in adaptation to requirements. This is highly advantageous, in particular, for different temperatures, different clamping forces or in particular also in the presence of wear, since resetting is made possible. In addition, it is thus possible to compensate for different tube diameters, e.g. resulting from tolerances or different coatings, etc. It is possible here, for example, for the stop or the stop element to be designed with a thread, and for the transverse pin to be designed with a corresponding, mating thread, which engages with the thread of the stop or stop element. The stop may thus be designed, for example, as a nut, or (adjusting) screw, preferably with an encircling toothing formation for adjustment by hand (e.g. knurled nut, knurled screw) and/or a ridge and/or a groove for the engagement of an adjustment tool. It is possible here to provide a safeguard against unintended release of the stop from the transverse pin (form fitting, force fitting, material bonding) during lever movement or use, although this safeguard nevertheless allows readjustment to be carried out via the nut or (adjusting) screw.

A further preferred embodiment is characterized in that the clamping device is formed, in the remaining axial region, that is to say in the region where no clamping takes place, for the purpose of receiving and fastening the portion of an outer tube, wherein the outer tube has an internal diameter which is essentially equal to, or only insignificantly greater than, the external diameter of the tube portion.

It is generally possible for the through-passage opening in the two protrusions to be a hole which is closed all the way round and preferably has a diameter in the range of 2-7 mm, wherein preferably the diameter of the transverse pin, in the region which passes through these through-passage openings, is in the range of 2-6 mm.

In particular in order to prevent unintended release, for example upon contact with an object or with a part of a body, it is possible for the lever arm, with the clamping device closed, to be arranged, at least in part or preferably essentially in its entirety, in a depression or channel in the plastics-material sleeve.

The inner tube, if not equipped with a clamping device arranged on the inside of the tube portions, preferably has, at its end, a guide element (e.g. a convex end stopper, typically inserted and fastened with force fitting and/or material bonding).

A further preferred embodiment is characterized in that a grip depression is located on one side of the remaining axial region.

The slot which renders that region of the plastics-material sleeve which engages around the tube portion variable preferably has in addition, in the zone adjacent to the encircling remaining axial region, a slot widening, preferably a slot widening which runs perpendicularly to the axial slot. This slot widening, preferably together with the axial slot, is of essentially T-shaped design and extends around the circumference of the sleeve in the range of 10-90°, preferably in the range of 20-50°.

The stop may preferably be designed in the form of a nut which has a wide portion, which rests on a shoulder of the second protrusion, and a tapered portion, wherein the tapered portion preferably has an internal thread. It is possible here for this nut to be produced, for example, as a whole from metal or ceramic material or a plastics material. It is also preferably possible here for an encircling recess which is present in the through-passage opening of this nut to have arranged in it an O-ring which is thick enough to ensure, along with an external thread (of the transverse pin) engaging in the nut, a level of friction which inhibits the rotation of the nut. However, the nut may also be produced from a plastics material which has a thread insert made of metal pressed into it or which has such a threaded insert made of metal embedded in it during injection molding. It is possible here in an axial region of the through-passage opening of the nut, where the peripheral region of the through-passage opening is not formed by the threaded insert, to allow the plastics material to project into the through-passage opening to the extent where rotation of the nut is inhibited by the friction of this plastics-material portion against the external thread.

The lever arm preferably engages at least partially around the plastics-material sleeve, it being possible here for the plastics-material sleeve to contain an at least partially or even fully encircling depression, in which the lever arm ends up located, at least in part, when the sleeve is closed.

A further preferred embodiment is characterized in that the transverse pin, preferably made of metal, has a first portion with an external thread, this first portion being provided in order to engage, for example, in the internal thread of a nut, as described in the above paragraph. Adjacent to this first portion, and preferably formed in a single piece therewith, the transverse pin has a flattened portion, that is to say a portion of which the cross-sectional surface area is not circular and also does not have any external thread. This second portion preferably contains a through-passage opening, in the direction transverse to the axis of the transverse pin, for the axial pin of the lever. For the purpose of reducing weight, it is possible for one or more further bores to be provided in this second portion, for example parallel to the direction in which the aforementioned through-passage opening for the axial pin runs. The length of the second portion here is selected such that this second portion engages in a corresponding through-passage opening of the metal element both in the open state and in the closed state of the lever.

It is possible for the metal element, as already explained, in the form of a metal plate, for example preferably of a thickness in the range of 1-3 mm and/or made of stainless steel, to have an extension, in order to prevent it from being rotated in the corresponding depression in the first protrusion. It is also possible for the metal element to have an elongate through-passage opening for the transverse pin. The cross-sectional opening here is for example, and preferably, adapted to, and just somewhat greater than, the cross-sectional surface area of the second portion of the transverse pin explained above.

The present invention also relates to a pole, in particular hiking pole, trekking pole, Nordic walking pole or (cross-country) ski pole, having a clamping device as has been described above, in particular preferably for the length adjustment of at least two tube portions or three tube portions.

It is possible here, in addition to the clamping device, for a clamping device with at least one spreading element to be provided on the inside of the tube portions. This clamping device may be an inner clamping device as has been described in EP 1 450 906.

Further exemplary embodiments are described in the dependent claims.

BRIEF DESCRIPTION OF THE DRAWINGS

Preferred embodiments of the invention will be described hereinbelow with reference to the drawings, which serve merely for explanatory purposes and should not be interpreted as being restrictive. In the drawings:

FIG. 1 shows a first exemplary embodiment of a clamping mechanism, wherein A)-D) illustrate lateral views in the direction of the appropriate arrows in E), E) illustrates a view from above, F) illustrates a view from beneath, G) illustrates a section taken along plane A-A indicated in A), and H) illustrates a perspective view as seen obliquely from above, and wherein the same clamping mechanism is illustrated in open form in FIGS. I)-N), wherein I) illustrates a view in the direction A), K) illustrates a view in the direction D), L) illustrates a perspective view as seen obliquely from above, M) illustrates a view from above, and N) illustrates a section taken along plane B-B according to FIG. I);

FIG. 2 shows a second exemplary embodiment of a clamping mechanism, this time with three axial slots, wherein A) illustrates a lateral view in the direction of A), B) illustrates a lateral view in the direction of B), both in the closed state, C) illustrates a perspective view in the open state, D) illustrates a view from above in the closed state, E) illustrates a view from beneath in the closed state, F) illustrates a section taken along plane A-A according to FIGS. A), and G) illustrates a perspective view in the closed state;

FIG. 5 shows a fifth exemplary embodiment of a clamping mechanism, wherein A)-D) illustrate lateral views in the direction of the appropriate arrows in E), E) illustrates a view from above, f) illustrates a view from beneath, G) illustrates a section taken along plane A-A indicated in A), and H) illustrates a perspective view as seen obliquely from above, and wherein the same clamping mechanism is illustrated in open form in FIGS. I)-N), wherein I) illustrates a view in the direction A), K) illustrates a view in the direction D), L) illustrates a perspective view as seen obliquely from above, M) illustrates a view from above, and N) illustrates a section taken along plane B-B according to FIG. I), wherein O) illustrates a section taken perpendicularly to the paper plane in G), through the axis of the lever, and wherein P) illustrates a plan view of the metal element;

FIG. 6 shows a sixth exemplary embodiment of a clamping mechanism, wherein A)-D) illustrate lateral views in the direction of the appropriate arrows in E), E) illustrates a view from above, F) illustrates a view from beneath, G) illustrates a section taken along plane D-D indicated in D), and H) illustrates a perspective view as seen obliquely from beneath, and wherein the same clamping mechanism is illustrated in open form in FIGS. I)-N), wherein I) illustrates a view in the direction A), K) illustrates a view in the direction D), L) illustrates a perspective view as seen obliquely from beneath, M) illustrates a view from beneath, and N) illustrates a section taken along plane A-A according to FIG. K), wherein O) illustrates a section taken perpendicularly to the paper plane in G), through the axis of the lever, and wherein P) illustrates a section taken along C-C in M), wherein Q) illustrates a lateral view solely of the lever, pin and adjusting screw and metal element, in the open position, R) illustrates a perspective view of the same, S) illustrates a perspective view of the correspondingly closed lever, V) illustrates a plan view, lateral view and perspective view of the metal element, T) illustrates a perspective view of the transverse pin, and U) illustrates a perspective view of a slightly modified embodiment of the transverse pin;

FIG. 7 shows views of a first design of an adjusting screw;

FIG. 8 shows views of a second design of an adjusting screw; and

FIG. 9 shows views of a third design of an adjusting screw.

Figure 3A:
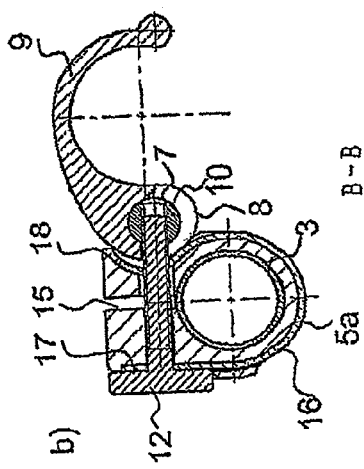
FIG. 3 shows a third exemplary embodiment in two sectional illustrations, in the closed state (A) and in the open state (B), taken along planes A-A according to FIGS. 1A) and 2A) and along plane B-B in FIG. 1I), respectively.

DESCRIPTION OF PREFERRED
EMBODIMENTS

Different views of a first exemplary embodiment of a clamping device 1 are illustrated in FIG. 1, wherein FIGS. 1A)-H) illustrate the closed position and FIGS. 1I)-Nn) illustrate the open position. The clamping device 1 comprises a plastics-material sleeve 5. This plastics-material sleeve is fastened at the upper end of an outer tube 2. For this purpose, a lower portion 5a has a corresponding stepped aperture in which this outer tube 2 is fastened, typically by a combination of force fitting and material bonding. Likewise possible is the additional or alternative use of form fitting, e.g. by way of an aperture in the tube in combination with a corresponding protuberance on the inside of the aperture of the sleeve. An inner tube 3 engages in this clamping device from the upper side, passes through the upper portion 5B and normally also projects some way into the outer tube 2. The internal diameter of the outer tube is normally essentially equal to, or only insignificantly greater than, the external diameter of the inner tube, and therefore the two tubes can slide in a guided manner one inside the other.

The plastics-material sleeve 5 is of encircling design in the lower portion 5A, whereas it has an axial slot 6 in the upper portion 5B. This slot is located between the two protrusions 13 and 14 which project radially from the sleeve in the upper portion. Between these two protrusions 13, 14 is a gap 15 which, in the closed position (cf., in particular, FIGS. D) and G)), is closed to a further extent, whereas, in the open position (cf., in particular k and n), it is open.

The two protrusions 13, 14 each have a through-passage opening 23, these openings being arranged perpendicularly to the axis 24 of the pole and running coaxially in relation to one another. A transverse pin 11 passes through this through-passage opening 23. The transverse pin 11 has, at its one end, a stop which, in the case of this exemplary embodiment, is designed as a knurled screw 12 and, on the radial circumferential surface, has a toothed or ribbed surface 21. This knurled screw 12 has its underside resting on the outside of the second protrusion 14. In this exemplary embodiment, in other words, the stop is formed in a single piece with the transverse pin, that is to say it forms a knurled screw. The adjustability then results via the engagement of this knurled screw in an internal thread of the rotary pin. As an alternative, it is possible to provide a knurled nut, and to provide the transverse pin with an external thread at the appropriate end. In this case, the transverse pin can be fixed rigidly to the rotary pin (for example in the form of a T-shaped component), and the adjustability then results via the rotation of the knurled nut on the thread of the transverse pin. However, it is also possible for the knurled nut, even in this embodiment, to be fixed to the transverse pin, and the adjustment then takes place, as in the above case, via the rotation of the transverse pin in the internal thread of the rotary pin.

At the other end, the transverse pin 11 has two lateral widenings (forming a T) which run coaxially and are arranged parallel to the axis 24 of the pole. These widenings form the rotary pin 7 for the clamping lever 4. The clamping lever 4 has a lever arm 9 which is of curved design, and therefore, in the closed state, it engages around the upper region 5b of the plastics-material sleeve, with positioning against the same.

At its other end, the lever 4 has an aperture, in which the rotary pin 7 is arranged.

In order that the lever can be pivoted at all about this pin 7, the clamping lever has, on this side, a slot 10, which runs over a circumferential portion and in which the transverse pin can run during the pivoting movement of the clamping lever. This results in the formation, on both sides of the transverse pin, of rolling regions 8, which are designed as eccentrics.

As can be seen, in particular, from FIGS. E), G), G) and M) and N), the eccentricity of this rolling region 8 means that the distance between the underside of the knurled screw 12 and the counter-surface 19, which is arranged on the outside of the first protrusion, assumes a minimum value as a result of the clamping by this rolling region. The radius of the rolling region is at a maximum, or more or less maximum, there in the closed position of the lever (cf. G).

With the lever open, in contrast (cf. N), there is a significantly smaller radius in the direction of the transverse pin in this rolling region 8, and therefore the plastics-material sleeve can widen as a result of the elasticity of the material, and the gap 15 can widen, because the underside of the adjusting screw is then at a greater distance from that part of the rolling region 8 which is then directed toward the counter-surface 19.

The knurled screw 12 in this case is formed essentially in a single piece with the transverse pin 11, and the transverse pin 11 has, at its end, a thread which engages in an internal thread in the pin 7. By virtue of the knurled screw 12 being rotated, it is thus possible for the distance between the knurled screw and the rotary pin 7 to be set in a variable manner, and therefore the maximum force for the clamping position can also be set correspondingly.

The clamping device, then, has, in particular, a metal sleeve 16 which, level with the clamping lever, runs around the sleeve 5 in the region 5B, on the side opposite to the gap 15. On the side which is directed toward the pin 7, the metal sleeve has a hole through which the transverse pin engages. The metal sleeve 16 is located in a depression 18 in this region and is planar, that is to say the counter-surface 19 is planar. This is followed by an encircling region which, with the lever closed, is concealed behind this lever, and becomes exposed and visible only when the lever is open (cf. L).

At its other end, the metal sleeve 16 has, in turn, a hole through which the transverse pin or the adjusting screw engages. The metal sleeve 16 here is located on the outside of the second protrusion 14, in a depression 17, wherein it is also the case that the depression 17, in the same way as the aforementioned depression 18, essentially has a depth which corresponds to the thickness of the metal sleeve. Just before the knurled screw 12, the metal sleeve runs through a slot 20.

By virtue of this metal sleeve 16 being arranged in an encircling manner with the two aforementioned openings for the through-passage of the transverse pin 11, the counter-surface 19 and the knurled screw 12 located opposite are, as it were, connected to one another around the circumference of the sleeve, which results in it being possible to set significantly higher clamping forces, since the clamping force which is determined by the force which can be applied around the circumference, rather than being determined any longer by the elasticity of tension of the plastics material used, is determined by the elasticity of tension of the metal sleeve. The metal sleeve 16 here is arranged in an encircling depression 22, and behind the lever when the latter is closed, and it is therefore barely visible, but can perform its function optimally and is easy to fit.

A second exemplary embodiment of a clamping device is illustrated in FIG. 2. The equivalent components and elements here, as in the rest of the figures, are indicated using the same designations as have already been used in FIG. 1.

The significant difference between this second exemplary embodiment and that shown in FIG. 1 is that, in this case, the upper portion 5B of the sleeve, rather than having just the single slot 6, 15 arranged between the two protrusions 13 and 14, also has two further slots, as can be seen, in particular, from FIG. 2C). These two additional slots 6 are distributed uniformly, together with the slot 15, around the circumference (each offset by 120 degrees), and they allow a significantly greater spreading region in the upper region 5b of the sleeve.

Figure 3B:
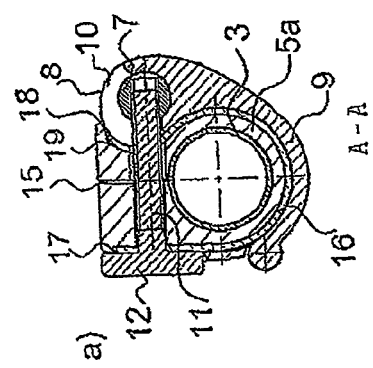

A further exemplary embodiment is illustrated in section in FIG. 3, in the closed state (A) and in the open state (B). This exemplary embodiment differs from the exemplary embodiment illustrated in FIG. 1 essentially only in that, in this case, the counter-surface 19, rather than being planar, is curved, that is to say it has a concave surface directed toward the rolling region 8 of the lever 4. This curved counter-surface 19 of the metal sleeve 16, for its part, is located in a curved depression 18 in the corresponding protrusion. This gives rise to a larger bearing surface between the rolling region 8 and this counter-surface 19, which may be advantageous for certain applications.

Figure 4A:
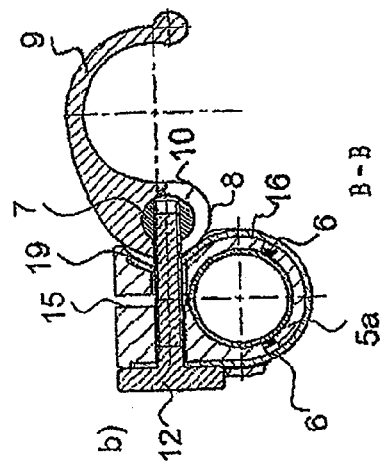
FIG. 4 shows a fourth exemplary embodiment in two sectional illustrations, in the closed state (a) and in the open state (B), taken along planes A-A according to FIGS. 1A) and 2A) and along plane B-B in FIG. 1I), respectively.
Figure 4B:
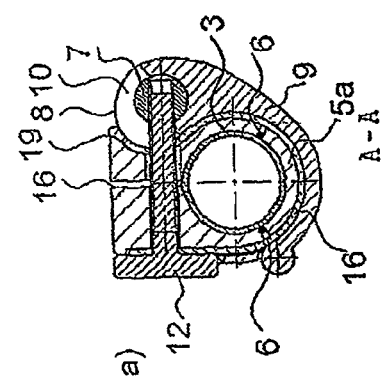

The fourth exemplary embodiment, as illustrated in FIG. 4, corresponds, in respect of the significant points, to the exemplary embodiment illustrated in FIG. 2, but differs from the latter insofar as, in this case too, the counter-surface 19 is of curved design, as already indicated in the third exemplary embodiment from FIG. 3.

A fifth exemplary embodiment is illustrated in FIG. 5, in the closed position 5A)-5H) and in the open position FIG. 5I)-5O). Here too, as indicated in conjunction with the discussion of the other figures, the same designations are used for identical, or equivalent, components.

In this case, the arm 9 of the clamping lever is of significantly narrower design in the axial direction and, in the closed state, is located, in particular, around the circumference of the upper region 5b in an encircling depression 25. The lever arm 9 has, at its end, a knob-like widening which, for its part, is arranged in a widening of this depression, and therefore this knob is easy to grip using one's fingers. As an alternative, it is also possible to have other formations on the lever, and in the case of a metal lever, these may also be produced from plastics material.

In this case, then, the transverse pin 11, as can be seen, in particular, from FIGS. 5G), 5N) and 5O), is designed in a fork-like manner at its end which is directed toward the lever. The two fork arms 30 define a slot in which the lever, in particular the rolling region 8 of the lever, is arranged. The lever is mounted in this slot by the rotary pin 7, which is arranged between the two fork arms 30 and, as it were, connects the same. Also arranged in this slot is a crosspiece 28 of the metal element 27, which in this case is designed as a special "washer". This is because the metal element 27, which is illustrated in a plan view specifically in FIG. 5P), has two halfmoon-like through-passage openings 29 which are located opposite one another and through each of which fork arms (these fork arms likewise have corresponding cross-sectional shapes) pass. In other words, this metal element 27 is guided between these two fork arms, simultaneously enclosing the same, and can be displaced in a displacement direction along the axis of the transverse pin 11, on the one hand bounded by the rolling surface and on the other hand bounded by the base of the forks. In order that the metal element 27 cannot rotate in the depression 18 in such a manner as to result in jamming of the two fork arms in the through-passage openings 29, the element 27 has an extension 32 beyond the rest of the radial circumference. This extension 32 is located in a corresponding radial widening 33 of the depression 18 and, when the metal element 27 is subjected to a torque, the latter is absorbed by the engagement of 32 in 33 and cannot result in jamming of the fork arms in the through-passage openings 29.

The metal element 27 is located in a depression in the first protrusion 13 and has its encircling region resting on a shoulder of the first protrusion. This shoulder serves as an encircling force-absorbing surface for the clamping operation.

The rolling region 8 runs correspondingly, in the case of this design, on the crosspiece 28. The force is transmitted from this crosspiece 28 to the annular region of the metal element 27 and from this annular region, via the aforementioned shoulder of the depression 17, to the first protrusion 13. It is thus possible to generate, very locally in metallic regions, very high forces, which can nevertheless be introduced over a large surface area into the first protrusion 13, i.e. plastics-material regions, and the local compressive loading to which the plastics material is subjected can thus be kept to a low level. Here too, the rolling region, once again, is of eccentric design. Also provided here is an adjusting screw 12, which is designed with an internal thread into which is screwed that end of the transverse pin which is designed as an external thread and is remote from the forks. It is thus possible, once again, to set the maximum clamping force.

It is, of course, possible to combine the individual exemplary embodiments with one another. It is thus possible, in particular, to combine the design according to FIG. 5 with a metal sleeve like that, for example, in FIG. 1, that is to say it is possible for the metal element 27 to be designed in the form of an encircling metal band. It is likewise possible for an exemplary embodiment as illustrated in conjunction with FIG. 5 to be configured with further axial slots 6 in order to achieve a greater adjustment range.

FIG. 6 illustrates a further exemplary embodiment according to the invention. In the case of this exemplary embodiment, the region of the plastics-material sleeve 5, i.e. specifically the lower region 5A of this sleeve, has arranged in it a grip depression 34 with a corrugated surface, which makes it easier to handle the pole in this region.

Furthermore, in the case of this exemplary embodiment, the axial slot 6 is of slightly v-shaped configuration, even in the closed state, as seen in a view parallel to the axis of the pole, as is evident for example in FIG. 6e or 6G.

Furthermore, the slot 6 widens, in the region of the transition between the upper portion 5B with slot and the lower portion 5A without slot, into a transversely running transverse slot 35. This transverse slot 35 results in the circumferential movement capability in the slotted region 5B being greater, but also smoother. In other words, a lower level of force is necessary in order to guide the two protrusions 13 and 14 together, by virtue of the lever 4 being folded over, and thus to produce the circumferential clamping around the inner tube 3.

In the case of this exemplary embodiment, the clamping lever 4 is narrow and tapers slightly toward its point, and, in addition, grip protuberances 37 are arranged on the inside of the slightly outwardly curved tip of this lever. In the closed position, as can be seen in FIGS. 6A-H, the arm 9 of the lever 4 is located in an encircling depression 25 arranged in the region 5b, on the rear side in relation to the slot 6. This results in a smooth overall contour, by virtue of the outward curvature at the tip, together with the grip protuberances, but the lever can readily be gripped, for the purpose of releasing the closed position, and pivoted open using one's finger, possibly even if one is wearing a glove.

The transverse pin 11, which is yet to be described in detail hereinbelow, is configured here as a pin with an external thread arranged at its end which is directed toward the lever. An adjusting screw 12 or a specifically configured knurled nut is screwed onto this external thread. This knurled nut 12 will also be described in detail hereinbelow.

As can be seen, for example, with reference to FIG. 6I, the lever 4 has a depression on its underside, which is directed toward the sleeve. This depression has engaging in it, in order better to define the closed position, an elevation 50, which is arranged in an encircling manner in the depression 25.

FIGS. 6Q-U will now be used to explain in more detail, in particular, the interaction between the transverse pin 11, lever 4 and adjusting screw 12. The transverse pin 11 has, at its one end, a flattened portion 39, which in this case has a rounded-rectangular cross section. This flattened region 39 has arranged in it a transversely running through-passage opening 40 for the axial pin 7, around which the lever is mounted in a pivotable manner. This through-passage opening 40 is directed essentially perpendicularly to the main direction of the transverse pin 11.

A threaded portion 38 is formed in one piece on this flattened region 39, and constitutes essentially a screw portion.

The metal element 27, which is illustrated in detail in FIG. 6V, has, over most of its circumference, a circular external shape, which widens somewhat in the manner of an extension 32 on one side. As is illustrated in FIG. 6G, this extension 32 engages in a corresponding widening 33, which is provided in the depression 18 in the protrusion 13, and it thus prevents rotation of the metal element 27 in the depression 18, as it were, about the axis of the transverse pin 11, and thus also prevents the transverse pin 11 and the lever arm 4 from being able to rotate about the axis of the transverse pin 11.

The flattened portion 39, then, has essentially the same cross-sectional surface area, just somewhat smaller, as an elongate through-passage opening 42 in the metal element 27. This through-passage opening 42 here is of rounded-rectangular design, but could just as easily be of some other shape corresponding to the cross-sectional surface area of the flattened portion 39, for example it could be square, but could also have some other shape adapted to the cross-sectional surface area of the portion 39. It should simply be non-circular, in order to preclude rotation of the pin 11 in the metal element 27, and in order that it is thus also possible to prevent rotation of the transverse pin 11 and lever arm 4 in relation to the sleeve about the axis of the transverse pin 11.

The flattened region 39, then, has such a length, in the axial direction of the transverse pin 11, that, both in the closed position (cf. FIG. 6S) and in the open position (cf. FIG. 6R), it is always in engagement with the matching through-passage opening 42. This ensures relative guidance of the through-passage opening 42 and flattened region 39 in each lever position.

A specific embodiment of such a transverse pin 11 is illustrated in FIG. 6U. In particular in the case of poles which have three tube portions and, correspondingly, require two such clamping mechanisms, it is important for the corresponding design of the clamp to be as lightweight as possible. In order to allow reduction in weight, it is possible for the transverse pin 11, in that region where the flattened portion 39 serves for guidance in the through-passage opening 42, to have a further bore, an additional bore 41. As is illustrated in FIG. 6u, this additional bore may run, as it were, parallel to the through-passage opening 40, but it may also run perpendicularly thereto, or it is also possible to provide two such bores, which meet in the center of the pin.

A further reduction in weight would be possible if the threaded portion 38 contained a cavity or if the transverse pin were designed, for example, as a two-part component in which the threaded region 38 consists of metal and the flattened region 39 consists of a plastics material, or in which also the threaded region is formed, only on its outside, from a metal threaded sleeve, with plastics material arranged in its interior.

FIGS. 7 to 9 respectively illustrate specific embodiments of knurled nuts 12, at the top left in a lateral view, at the top center in a front view, at the top right in a section taken along line x-x in the central figure; various views of insert elements are illustrated in the center and two perspective views are illustrated at the bottom.

In each of the three cases according to FIGS. 7 to 9, the knurled nut has a tapered portion 44 and a wide portion 43, which is designed, in particular, to rest on a shoulder formed by the depression 26, for example according to FIG. 6G, in order thus to allow the leverage to act on the protrusion 14. The tapered portion 44 engages in the through-passage opening 23, as can likewise be seen with reference to FIG. 6G.

In the exemplary embodiment according to FIG. 7, then, the entire knurled nut 12 is produced from steel, and it has an internal thread 46 in particular in the tapered portion 44. This internal thread interacts with the external thread on the threaded portion 38 of the transverse pin 11. Furthermore, the wide adjustment portion 43 has, on the outside, a toothing formation, in order that adjustment can be carried out easily using one's fingers, and also a slot 36, in which, for example, a tool or a coin can engage.

On the front side, in addition, the direction in which rotation has to be carried out in order for the screw to be secured or released is indicated.

It is important for such screws not to loosen gradually, or else become undesirably tight, during use. Correspondingly, in the case of the exemplary embodiment according to FIG. 7, as can be seen, in particular, with reference to the figure at the top right, the through-passage opening of the nut, in the region of the wide adjustment portion, contains an encircling recess, into which an O-ring 45 made of rubber is introduced. This O-ring has such a thickness that it projects some way into the through-passage opening and correspondingly comes into contact with the external thread of the threaded portion 38 of the transverse pin 11. The friction between the O-ring 45 and the external thread of the portion 38 is set here such that the nut can be rotated relative to the transverse pin 11 only with specific manipulation.

A further exemplary embodiment is illustrated in FIG. 8, in this case the knurled nut 12 being produced from plastics material, for example polyamide or polypropylene, and the threaded region being formed by a threaded insert 47 made of metal with an internal thread. Such a knurled nut is produced, for example, by the threaded insert being provided in an injection mold and then encapsulated with the plastics material.

In order for the threaded portion 47 made of metal to be anchored well in the plastics material of the rest of the component, it has encircling ribs and also, in particular, a terminal flange 48, which then ends up located approximately in the wide adjustment portion 43.

In order also to ensure here that rotation of the nut relative to the pin is inhibited, it is possible, in that region 49 where the plastics material forms the outer wall of the through-passage opening, for this plastics material to be curved inward to a slight extent, either all the way round or only at certain points, the corresponding protrusions generating a similar effect to that provided by the O-ring 45 according to FIG. 7.

A third embodiment is illustrated in FIG. 9. This figure likewise has a metal sleeve 47, likewise with a flange 48, although in this case the flange 48 is arranged at that end of the portion 44 which is directed toward the lever. In the case of such a design, it is possible, for example, for the threaded insert 47 to be pressed into a component which has already been injection molded beforehand. In order then nevertheless still to ensure functionality, it is advantageous, and in some circumstances even necessary, for the portion 14, as can be seen in the insert at the bottom right of FIG. 9, to contain a supporting shoulder 50, on which the flange 48, and thus the knurled nut 12 as a whole, can then be supported, the metal element 48 being prevented from being torn, as it were, out of the plastics-material region.

LIST OF DESIGNATIONS

| | | | |
|---|---|---|---|
| 1 | Clamping device | 5 | Plastics-material sleeve |
| 2 | Outer tube | | |
| 3 | Inner tube | 5a | Lower portion of 5 |
| 4 | Clamping lever | 5b | Upper portion of 5 |
| 6 | Axial slot in 5B | 29 | Through-passage openings in 27 for 30 |
| 7 | Rotary pin of 4, axial pin | 30 | Fork arms of 11 |
| 8 | Rolling region of 4 | 31 | Slot between 30 |
| 9 | Lever arm of 4 | 32 | Extension on 27, extension |
| 10 | Slot in 8 | | |
| 11 | Transverse pin | 33 | Radial widening for 32 in 18 |
| 12 | Adjusting screw, knurled nut | 34 | Grip depression |
| 13 | First protrusion | 35 | Transverse slot |
| 14 | Second protrusion | 36 | Slot in 12 |
| 15 | Gap between 13 and 14 | 37 | Grip protuberances |
| 16 | Metal sleeve | 38 | Threaded portion of 11 |
| 17 | Depression in 14 for 16 | 39 | Flattened portion of 11 |
| 18 | Depression in 13 for 16 | 40 | Through-passage opening for axial pin 7 |
| 19 | Counter-surface for 8 on 16 | | |
| 20 | Slot in 5 for 16 | 41 | Additional bore in 39 |
| 21 | Toothed surface of 12 | 42 | Through-passage opening for 39 |
| 22 | Encircling depression in 5B for 16 | 43 | Wide adjustment portion of 12 |
| 23 | Through-passage opening in 13 and 14 for 11 | 44 | Tapered portion of 12 |
| | | 45 | O-ring |
| 24 | Axis of the pole | 46 | Internal thread in 44 |
| 25 | Depression in 5 for 9 | 47 | Threaded insert with internal thread |
| 26 | Depression for 12 in 14 | 48 | Flange on 47 |
| | | 49 | Portion of 12 |
| 27 | Metal element | 50 | Supporting shoulder on 14 |
| 28 | Crosspiece | | |

The invention claimed is:

1. A clamping device for a hiking pole, trekking pole, Nordic walking pole, ski pole or cross-country ski pole, for axially securing in a releasable manner a tube portion that can be pushed into an opening of the clamping device,
   wherein the clamping device comprises a plastics-material sleeve which engages essentially directly around the tube portion, at least along an axial portion, and clamps the tube portion in a closed state,
   wherein the plastics-material sleeve, at least in a region engaging around the tube portion, has at least one axial slot, which renders a circumference of the plastics-material sleeve variable in said region, and is of an essentially encircling design in a remaining axial region,
   wherein a respective first protrusion and second protrusion is arranged on the plastics-material sleeve on either side of said axial slot,
   wherein said protrusions have a coaxial through-passage opening, which is arranged essentially perpendicularly to an axis of the tube portion and through which engages a transverse pin which, on an outside of the second protrusion, has a stop and, on an outside of the first protrusion, has a rotary pin for a clamping lever, said rotary pin being arranged perpendicularly to an axis of the transverse pin and parallel to the axis of the tube portion,
   wherein the clamping lever has a lever arm which, with the clamping device closed, engages at least partially around the plastics-material sleeve, and
   wherein the clamping lever has an eccentric rolling region around the rotary pin, it being possible for a distance between the stop and a counter-surface for the eccentric rolling region, the counter surface being arranged on the outside of the first protrusion, to be reduced by means of said eccentric rolling region for clamping purposes, by virtue of the clamping lever being pivoted into the closed position, and
   wherein the counter-surface is designed in the form of a metal element facing towards and in contact with said eccentric rolling region, and which metal element is arranged, at least in part, in the first protrusion, in a depression.

2. The clamping device as claimed in claim 1, wherein the counter-surface is designed as a planar surface.

3. The clamping device as claimed in claim 1, wherein the counter-surface is designed as a concave surface of which a radius of curvature thereof is adapted essentially to a radius of curvature of the rolling region.

4. The clamping device as claimed in claim 1, wherein the metal element is designed in the form of a metal band which encircles an outside of the plastics-material sleeve, on a side located opposite the protrusions, and of which a first end is arranged on the outside of the first protrusion, the outside being directed toward the rolling region, in a depression and has a first aperture or a through-opening for the transverse pin, a central region of which band runs around the plastics-material sleeve, and a second end of which band is arranged on the outside of the second protrusion, this outside being directed toward the stop, and has a second aperture or a through-opening for the transverse pin and/or a stop element.

5. The clamping device as claimed in claim 4, wherein the metal band has a width of 1-20 mm.

6. The clamping device as claimed in claim 4, wherein the metal band has a width of 3-7 mm.

7. The clamping device as claimed in claim 4, wherein the metal band has a thickness in the range of 0.1-2 mm.

8. The clamping device as claimed in claim 4, wherein the metal band consists of hardened steel, stainless steel or spring steel.

9. The clamping device as claimed in claim 1, wherein the metal element has a respective through-opening on either side of the counter-surface and the counter surface is formed by a crosspiece located therebetween, and wherein the transverse pin is designed in a fork-like manner at its clamping lever end, wherein the two fork arms engage through the through-openings, wherein the rotary pin is arranged at the ends of the fork arms, and connect the same, and wherein the eccentric rolling region of the clamping lever is arranged between the fork arms such that it runs on the crosspiece when the clamping lever pivots.

10. The clamping device as claimed in claim 9, wherein the metal element is designed in the form of a circular disk and is arranged in the depression in the first protrusion such that it can be displaced along the axis of the transverse pin, and wherein the depth of the depression is greater than the thickness of the metal element.

11. The clamping device as claimed in claim 9, wherein the metal element is designed in the form of a circular disk and is arranged in a depression in the first protrusion such that it can be displaced along the axis of the transverse pin, and in that the depth of the depression is greater than the thickness of the metal element, wherein the thickness of the metal element is in the range of 0.5-3 mm, and the depth of the depression is in the range of 3-10 mm.

12. The clamping device as claimed in claim 1, wherein the transverse pin is of T-shaped design at its clamping-lever end, wherein the lateral arms form the rotary pin for the clamping lever, and the clamping lever, for the transverse pin, has a slot which divides up the eccentric rolling region into two rolling regions arranged to the sides of the transverse pin.

13. The clamping device as claimed in claim 1 wherein the plastics-material sleeve, in an upper portion, has at least two axially running slots, wherein at least one of said slots is arranged between the two protrusions.

14. The clamping device as claimed in claim 1, wherein the stop is of adjustable design.

15. The clamping device as claimed in claim 1, wherein it is formed, in the remaining axial region, for the purpose of receiving and fastening the portion of an outer tube, wherein the outer tube has an internal diameter which is essentially equal to, or only insignificantly greater than, the external diameter of the tube portion.

16. The clamping device as claimed in claim 1, wherein the through-passage opening in the two protrusions is a hole which is closed all the way round.

17. The clamping device as claimed in claim 1, wherein the lever arm, with the clamping device closed, is arranged, at least in part, in a depression in the plastics-material sleeve, and/or wherein the lever is produced from metal, wholly or partially from surface-hardened metal.

18. A hiking pole, trekking pole, Nordic walking pole, ski pole or cross-country ski pole, having a clamping device as claimed in claim 1.

19. The pole as claimed in claim 18, wherein, in addition to the clamping device, a clamping device with at least one spreading element is provided on the inside of the tube portions.

20. The clamping device as claimed in claim 1, wherein the metal element is designed in the form of a single-piece metal band which encircles the outside of the plastics-material sleeve, on the side located opposite the protrusions, and of which the first end is arranged on the outside of the first protrusion, the outside being directed toward the rolling region, in a depression and has a first aperture or a through-opening for the transverse pin, the central region of which band runs around the plastics-material sleeve, in an encircling depression, and the second end of which band is arranged on the outside of the second protrusion, this outside being directed toward the stop, in a depression, and has a second aperture or a through-opening for the transverse pin and/or a stop element.

21. The clamping device as claimed in claim 1, wherein the plastics-material sleeve, in its upper portion, has at least three, axially running slots, wherein at least one of these slots is arranged between the two protrusions and these slots are distributed uniformly around the circumference.

22. The clamping device as claimed in claim 1, wherein the stop is of adjustable design, and wherein the stop is designed with a thread and the transverse pin is designed with a mating thread, and the stop is designed as a nut or screw, with an encircling toothing formation or a ridge or a groove for the engagement of an adjustment tool.

23. The clamping device as claimed in claim 1, wherein the through-passage opening in the two protrusions is a hole which is closed all the way round and has a diameter in the range of 2-7 mm.

24. The clamping device as claimed in claim 1, wherein the lever arm, with the clamping device closed, is arranged, at least in part, in a depression in the plastics-material sleeve, and wherein the lever is produced from metal, wholly or partially from surface-hardened metal, hardened in the rolling region, and wherein formed-on plastics-material regions, made of easy-to-grip material, are provided.

25. A hiking pole, trekking pole, Nordic walking pole ski pole or cross-country ski pole, having a clamping device as claimed in claim 1, for the length adjustment of at least two tube portions or three tube portions.

26. A clamping device for a hiking pole, trekking pole, Nordic walking pole, ski pole or cross-country ski pole, for axially securing in a releasable manner a tube portion that can be pushed into an opening of the clamping device,
  wherein the clamping device comprises a plastics-material sleeve which engages essentially directly around the tube portion, at least along an axial portion, and clamps the tube portion in a closed state,
  wherein the plastics-material sleeve, at least in a region engaging around the tube portion, has at least one axial slot, which renders a circumference of the plastics-material sleeve variable in said region, and is of essentially encircling design in a remaining axial region,
  wherein a respective first protrusion and second protrusion is arranged on the plastics-material sleeve on either side of said slot,
  wherein said protrusions have a coaxial through-passage opening, which is arranged essentially perpendicularly to an axis of the tube portion and through which engages a transverse pin which, on an outside of the second protrusion, has a stop and, on an outside of the first protrusion, has a rotary pin for a clamping lever, said rotary pin being arranged perpendicularly to an axis of the transverse pin and parallel to the axis of the tube portion,
  wherein the clamping lever has a lever arm which, with the clamping device closed, engages at least partially around the plastics-material sleeve,
  wherein the clamping lever has an eccentric rolling region around the rotary pin, it being possible for a distance between the stop and a counter-surface, which is arranged on the outside of the first protrusion, to be reduced by means of said eccentric rolling region for clamping purposes, by virtue of the clamping lever being pivoted into the closed position,
  wherein the counter-surface is designed in the form of a metal element facing towards and in contact with said eccentric rolling region, and which metal element is arranged, at least in part, in the first protrusion, in a depression,
  wherein the transverse pin has, at its one end, a flattened portion, having arranged therein a transversely running through-passage opening for the rotary pin,
  wherein the metal element has an elongate non-circular through-passage opening for the flattened portion of the transverse pin, the elongate non-circular through-passage opening of the metal element having essentially a same cross-sectional area as the flattened portion of the transverse pin, and
  wherein the cross-sectional area of the flattened portion of the transverse pin is designed just enough smaller than a cross-sectional area of the elongate non-circular through-passage opening of the metal element, to allow receipt of the flattened portion of the transverse pin by said elongate non-circular through passage of the metal element.

* * * * *

UNITED STATES PATENT AND TRADEMARK OFFICE
CERTIFICATE OF CORRECTION

PATENT NO. : 8,807,152 B2  Page 1 of 1
APPLICATION NO. : 13/846473
DATED : August 19, 2014
INVENTOR(S) : Lenhart et al.

It is certified that error appears in the above-identified patent and that said Letters Patent is hereby corrected as shown below:

On the title page item [71], insert --Lekisport AG, Baar (CH)--

On the title page item [72], Klaus Lenhart
　　　　delete "Eberhad Heim" insert --Eberhard Heim--

Signed and Sealed this
Twenty-second Day of March, 2016

Michelle K. Lee
*Director of the United States Patent and Trademark Office*